(12) United States Patent
Ballot et al.

(10) Patent No.: US 9,344,830 B2
(45) Date of Patent: May 17, 2016

(54) HANDLING OF M2M SERVICES IN A COMMUNICATION SYSTEM

(75) Inventors: Jean-Marc Ballot, Nozay (FR); Laurent Thiebaut, Nozay (FR)

(73) Assignee: GEMALTO SA, Meudon (FR)

(*) Notice: Subject to any disclaimer, the term of this patent is extended or adjusted under 35 U.S.C. 154(b) by 633 days.

(21) Appl. No.: 13/520,450

(22) PCT Filed: Dec. 29, 2010

(86) PCT No.: PCT/EP2010/070845
§ 371 (c)(1),
(2), (4) Date: Sep. 14, 2012

(87) PCT Pub. No.: WO2011/083065
PCT Pub. Date: Jul. 14, 2011

(65) Prior Publication Data
US 2013/0003609 A1    Jan. 3, 2013

(30) Foreign Application Priority Data

Jan. 5, 2010 (EP) .................................. 10305012

(51) Int. Cl.
*H04W 4/00* (2009.01)
*H04L 29/08* (2006.01)
*H04L 12/24* (2006.01)

(52) U.S. Cl.
CPC ................. *H04W 4/00* (2013.01); *H04L 67/12* (2013.01); *H04W 4/005* (2013.01); *H04L 41/0803* (2013.01)

(58) Field of Classification Search
CPC ... H04M 15/66; H04L 12/1407; H04L 12/14; H04W 4/24; H04W 4/005; H04W 4/26
See application file for complete search history.

(56) References Cited

U.S. PATENT DOCUMENTS

| 2007/0036312 | A1  | 2/2007  | Cai et al. |
| 2009/0264097 | A1  | 10/2009 | Cai et al. |
| 2010/0057485 | A1* | 3/2010  | Luft .................................. 705/1 |
| 2010/0150003 | A1* | 6/2010  | Andreasen et al. ........... 370/252 |
| 2010/0290392 | A1* | 11/2010 | Rasanen et al. ............... 370/328 |
| 2011/0053619 | A1* | 3/2011  | Shaheen et al. .............. 455/466 |
| 2011/0128911 | A1* | 6/2011  | Shaheen ....................... 370/328 |

(Continued)

FOREIGN PATENT DOCUMENTS

| CN | 1885780 A    | 12/2006 |
| JP | 2002318899 A | 10/2002 |

(Continued)

OTHER PUBLICATIONS

3GPP TS 32.251, "3GPP Technical Specification Group Services and System Aspects: Telecommunication management; Charging management; Packet Switched domain charging (Release 8)", Sep. 2009, V8.7.0.*

(Continued)

*Primary Examiner* — Jung Park
(74) *Attorney, Agent, or Firm* — Fay Sharpe LLP

(57) ABSTRACT

In an embodiment, there is provided a method for handling Machine to Machine M2M services in a communication system, said method comprising a step of, for charging for IP Connectivity Access Network IP-CAN bearer services in said communication system:

providing global charging information for a plurality of terminals using a same M2M service.

19 Claims, 1 Drawing Sheet

(56) References Cited

U.S. PATENT DOCUMENTS

| | | | |
|---|---|---|---|
| 2011/0161503 A1* | 6/2011 | Krebs | 709/227 |
| 2011/0238547 A1* | 9/2011 | Belling et al. | 705/34 |
| 2012/0004003 A1* | 1/2012 | Shaheen et al. | 455/509 |
| 2012/0036186 A1* | 2/2012 | Mariblanca Nieves | 709/203 |
| 2012/0084425 A1* | 4/2012 | Riley et al. | 709/223 |

FOREIGN PATENT DOCUMENTS

| | | |
|---|---|---|
| JP | 2009512235 A | 3/2009 |
| JP | 2009200991 A | 9/2009 |

OTHER PUBLICATIONS

"3$^{rd}$ Generation Partnership Project; Technical Specification Group Services and System Aspects; Study on Facilitating Machine to Machine Communication in 3GPP Systems; (Release 8)," 3GPP TR 22.868 V8.0.0 pp. 1-15, XP050361381, Mar. 1, 2007.

Ericsson, "M2M Security Considerations," 3$^{rd}$ Generation Partnership Project (3GPP), TSG-SA WG1 #35, S1-070058, Agenda Item: 8, pp. 1-4, XP050226188, Bangalore, India, Jan. 29-Feb. 2, 2007.

International Search Report for PCT/EP2010/070845 dated Feb. 14, 2011.

Written Opinion of the International Searching Authority of International Application No. PCT/EP2010/070845 dated Feb. 14, 2011, 8pp.

European Search Report of European Application No. 10305012.6-2416 dated Apr. 28, 2010, 8pp.

European Search Report of European Application No. 12187971.2-2416 dated Dec. 18, 2012, 9pp.

English Bibliography for Chinese Patent Application No. CN1885780A, published Dec. 27, 2006, printed from Thomson Innovation on May 18, 2015, 4pp.

English Bibliography for Japanese Patent Application No. JP2002318899A, published Oct. 31, 2002, printed from Thomson Innovation on Feb. 28, 2015, 3pp.

English Bibliography for Japanese Patent Application No. JP2009512235, published Mar. 19, 2009, printed from Thomson Innovation on May 18, 2015, 4pp.

English Bibliography for Japanese Patent Application No. JP2009200991A, published Sep. 3, 2009, printed from Thomson Innovation on Feb. 28, 2015, 3pp.

\* cited by examiner

FIG 1
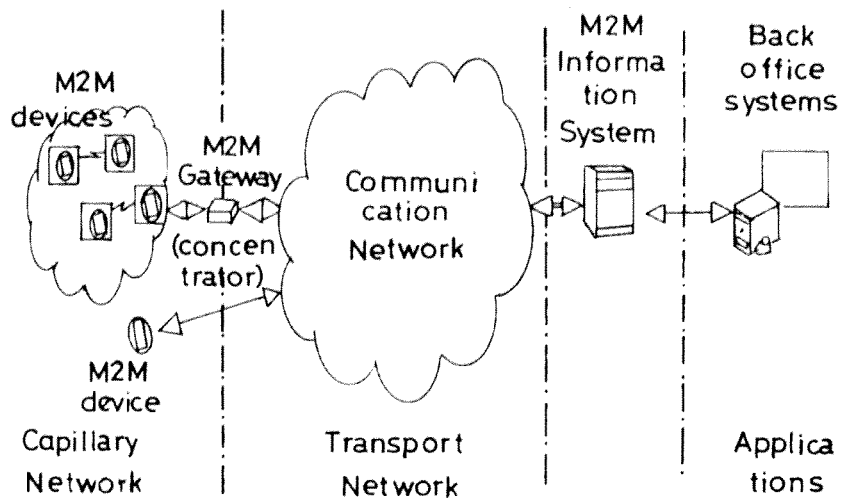
FIG 2
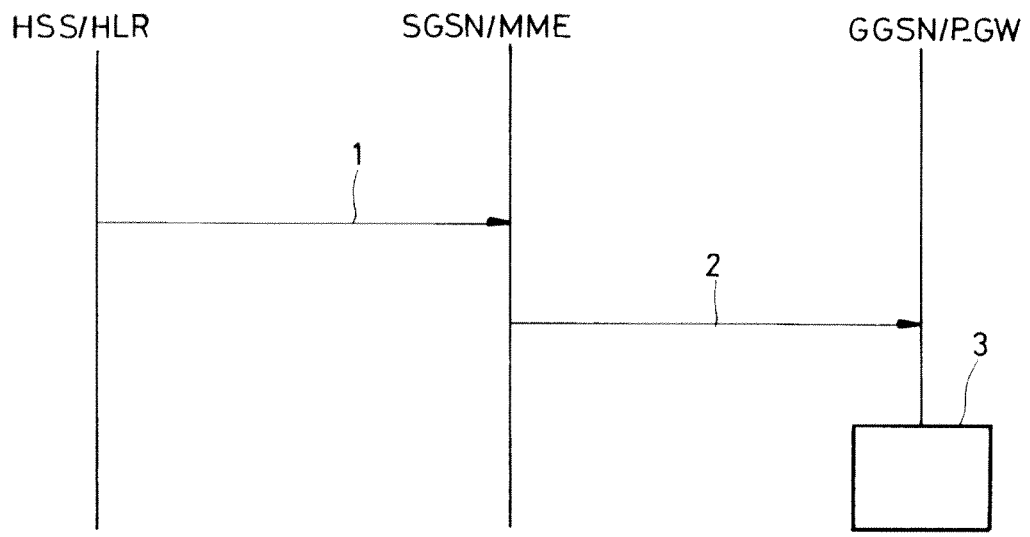
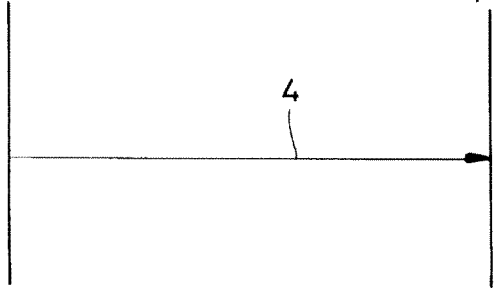
FIG 3

HANDLING OF M2M SERVICES IN A COMMUNICATION SYSTEM

CROSS-REFERENCE TO RELATED APPLICATIONS

This application is a U.S. national filing of PCT/EP2010/070845 which is based on European Patent Application No. 10305012.6 filed Jan. 05, 2010, the disclosure of which is hereby incorporated herein by reference in its entirety, and the priority of which is hereby claimed.

FIELD OF THE INVENTION

The present invention generally relates to communication networks and systems, such as for example wireless or mobile communication networks and systems.

BACKGROUND

Descriptions of such networks and systems can be found in the litterature such as in particular in Technical Specifications published by standardisation bodies. Examples of standardisation bodies include 3GPP ($3^{rd}$ Generation Partnership Project) . . . etc.

In such systems, a terminal (such as for example Mobile Station MS or User Equipment UE) has access to communication services via an Access Network, enabling various user services and applications.

An example of Access Network is the IP Connectivity Access Network (IP-CAN) providing IP connectivity, enabling various IP-based user services and applications. Examples of IP-CAN include GPRS (as specified in particular in 3GPP TS 23.060) and Evolved Packet Core (EPC) (as specified in particular in 3GPP TS 23.401). IP-CAN includes network nodes such as for example Serving GPRS Support Nodes (SGSN), Serving Gateway (S-GW), Gateway GPRS Support Node (GGSN) and PDN Gateway (P-GW).

SUMMARY

Services provided by IP-CAN, or IP-CAN bearer services (including in particular establishing and maintaining IP-CAN connections) are subject to charging.

Generally, charging is a function whereby information related to chargeable events is formatted and transferred in order to make it possible to determine usage for which the charged party may be billed.

IP-CAN bearer charging is specified in particular in 3GPP TS 32.251. In particular, charging information related to chargeable events is formatted into Charging Data Records CDRs, including in particular S-CDR, G-CDR, SGW-CDR and PGW-CDR used to collect charging information related to the IP-CAN bearer for a MS/UE respectively in the SGSN, in the GGSN, the S-GW and the P-GW.

Historically mobile networks were mainly designed for enabling voice communication between human beings. Then some additional services were added, e.g. data service, SMS, . . .

Currently, a new kind of communications is emerging: the Machine-to-Machine communication (M2M). In M2M, the communication is not between human beings but between two machines that doesn't need necessarily human interaction.

With the development of Machine to Machine (M2M) communications (e.g. captors, sensors, . . . ) huge amounts of new automatic M2M Mobile Terminals are going to be deployed. A large part of these new automatic M2M terminals will use Mobile Networks for exchanging messages with the M2M information system and the M2M Backoffice systems. Those M2M mobile terminals will request IP-CAN connections that are subject to charging.

As recognized by the inventors, an issue is that there will likely be huge numbers of M2M terminals that typically send only a very limited amount of data per day but spread over time (e.g. a few hundred of bytes per ¼ hour, or even less than that, once per hour). If a CDR is to be built for each of these M2M mobile terminal access (as recalled above), the mobile system will have to handle a huge amount of charging related data that may even correspond to a greater amount of data than what the M2M mobile terminal did actually exchange over the mobile network.

Currently this issue is not solved whereas the M2M market is emerging. The number of M2M devices that are managed via a mobile network is currently not huge, but it is foreseen that in the next future some applications (e.g. Smart Metering) could have to manage several millions of new M2M devices.

Embodiments of the present invention in particular enable to solve such problems and/or avoid such drawbacks. More generally, it is an object of embodiments of the present invention to improve handling of M2M services in communication systems.

These and other objects are achieved, in one aspect, by a method for handling Machine to Machine M2M services in a communication system, said method comprising, in an embodiment, a step of, for charging for IP Connectivity Access Network IP-CAN bearer services in said communication system:

provinding global charging information for o plurality of terminals using a same M2M service.

These and other objects are achieved, in another aspect, by a method for handling Machine to Machine M2M services in a communication system, said method comprising, in an embodiment, a step of:

controlling an association between a M2M service identifier and the M2M terminals supporting this M2M service.

These and other objects are achieved in other aspects, by entities for carrying out such methods, said entities including in particular: entity storing subscriber data (such as HSS/HLR), entity controlling IP-CAN bearer services (such as SGSN/MME), entity creating charging information such as CDRs (such as GGSN/P-GW), and entity in charge of managing communications of M2M terminals via a communication system.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 is intended to illustrate a high level view of a M2M mobile communication system, FIG. 2 is intended to illustrate charging for IP-CAN bearer services according to an embodiment of the present invention, FIG. 3 is intended to illustrate controlling of M2M services according to an embodiment of the present invention.

DESCRIPTION OF EMBODIMENTS

From a high level point of view, a M2M system n generally be represented as illustrated in FIG. 1.

The Back Office systems contains the Applications that manage the M2M Devices and the data handled by them.

The M2M Information System is in charge to manage the communications with the M2M Devices via a specific Communication Network.

The Communication Network allows to transport data from/to Applications to/from M2M Devices or M2M Gateways. This network can be a public network (e.g. 3GPP, TISPAN, CDMA, . . . ) or any other kind of network (Ethernet, PLC (PowerLine Communication), . . . ).

A M2M Gateway is a specific M2M network element that is in charge to manage some M2M Devices via a M2M capillary network. A lot of types of capillary network (wired or wireless) are currently existing depending on the kind of handled data, the kind of topology, topography, range, . . . One of the main goals of a M2M Gateway is for example the aggregation of the data collected from the M2M Devices before sending them in a more concentrated way to the central Application.

A Back Office system can exchange messages with M2M Devices by using some specific protocols.

Some M2M Systems can handle a huge number of M2M Devices (for example in Smart Metering in which the M2M Application remotely collect the value of each M2M Device that are the electricity counters).

In the following a M2M Mobile Terminal may be

A M2M device accessing directly to the mobile network

A M2M Gateway that is in charge to manage some M2M Devices via a M2M capillary network and to support access to a mobile network on behalf of these M2M devices.

As recognized by the inventors, the current approach in terms of billing in the Mobile Networks is to gather information in order to send a bill to the end-user that owns the terminal, Now, considering that the entity to be charged is likely not the individual M2M mobile terminal but the M2M service user (e.g. the M2M application), it is proposed, in an embodiment, to have a global CDR for all the M2M mobile terminals supporting the same M2M service. Even when there are 100 K(s) of M2M mobile terminals for some utility metering service (on behalf of an electricity distribution company), then there will be only one CDR built by the mobile network.

Furthermore for this (M2M) type of mobile user, the frequency to build CDR/send charging information may be reduced to e.g. once per day instead of a classical ¼ hour.

In an embodiment, the M2M mobile terminals may be allocated 2 identifiers by the mobile network One to identify the M2M mobile terminal itself e.g. the IMSI (International Mobile Subscriber Identity)

One to identify the M2M service e.g. the MSISDN (Mobile Station International ISDN Number)

All M2M mobile terminals for a given service would have different M2M mobile terminal identifiers (e.g. IMSI) but the same service related identifier (e.g. MSISDN)

When an entity creating charging related data and signaling (e.g. PGW/GGSN) for the IP-CAN (IP Connectivity Access Network) service is being told that a mobile end-user actually corresponds to a M2M service, it does not create CDR or charging related messages dedicated to this mobile end-user (M2M mobile terminal) but agglomerates the associated charging information with the one associated with all other mobile end-user (M2M mobile terminal) for the same M2M service. The result is that only one CDR/charging related signaling message is to be created for all mobile end-user actually that corresponds to the same M2M service.

In an embodiment, following steps may be provided as illustrated in FIG. 2:

In step 1, an entity storing subscriber data (such as HSS/HLR) provides to an entity controlling the IP-CAN service (such as SGSN/MME) an indication that a mobile user is actually a M2M mobile terminal together with an indication of the M2M service of that M2M mobile terminal. This indication is provided within the subscriber data of a mobile user that has just attached to the network (This includes the provisioning of a single MSISDN for all M2M mobile users corresponding to the same M2M service (as negotiated between the Mobile Network Operator and the M2M application))

In step 2, the entity controlling the IP-CAN service (such as SGSN/MME), provides this information to entities creating charging related data and signaling (e.g. GGSN/P-GW) for the IP-CAN service. This is provided in the signaling (e.g. in GTP PDP context activation/Create Session Request) associated with the creation of an IP-CAN bearer (e.g. PDP context/PDN connection)

In step 3, an entity creating charging related data and signaling (e.g. P-GW/GGSN) for the IP-CAN service, Does not create individual CDR or charging related messages dedicated to a mobile identified as being actually a M2M mobile terminal. This entity agglomerates the associated charging information with the one associated with all other M2M mobile terminal for the same M2M service.

Considers a specific charging data generation scheme i.e. agglomerates charging related information for a longer period than for the case of a classical user.

Other aspects and embodiments of the present invention will be described in the following.

In an embodiment, an interface may be provided by the mobile network operator to the M2M Information System (in charge to manage the communications with the M2M Devices via a specific Communication Network) in order for the M2M Information system to be able to set the mapping between A M2M mobile terminal A M2M service negotiated between the M2M Information System and the Communication Network This allows e.g. the M2M Information system to temporary (during a "deployment testing period") associate a specific service to a set of new devices it is deploying (or to a set of existing devices on which a new software version has been downloaded) and after a test period used to validate those new devices/Software version to associate those devices with the main stream service, During this "deployment testing period", specific charging information is held for the new devices, allowing to check that they behave correctly before adding them to the mainstream service.

In an embodiment, the interface between the M2M Information System and the (Mobile) communication operator, is terminated on the HSS/HLR of this operator and allows to associate an identifier of the device such as the IMSI (International Mobile Subscriber Identity) of the device with an identifier of the M2M service e.g. the MSISDN (Mobile Station International ISDN Number).

In an embodiment, following steps may be provided as illustrated in FIG. 3:

in step 4, an entity (such as a M2M Information System entity) in charge of managing communications of M2M terminals, controls in an entity storing subscriber data in said communication system (such as HSS/HLR) an association between a M2M service identifier and the M2M terminals supporting this M2M service.

In one aspect, in an embodiment, the present invention provides a method for handling M2M services in a communication system, said method comprising a step of, or charging for IP-CAN bearer services in said communication system:

providing global charging information for a plurality of terminals using a same M2M service.

In an embodiment, said method comprises a step of:
an entity storing subscriber data providing to an entity controlling said IP-CAN bearer services an indication that a terminal supports a M2M service.

In an embodiment, a single M2M service identifier is provided for said plurality of terminals using a some M2M service.

In an embodiment, said method comprises a step of:
an entity controlling said IP-CAN bearer services providing to an entity creating charging information for said IP-CAN bearer services an indication that a terminal supports a M2M service.

In an embodiment, said indication is provided in the signalling associated with the creation of said IP-CAN bearer.

In an embodiment, said method comprises a step of:
an entity creating charging information for said IP-CAN bearer services agglomerating charging information associated with a terminal supporting a M2M service with charging information associated with other terminals supporting said M2M service.

In an embodiment, charging information is periodically created, and the period for creating charging information is depending of whether a terminal is supporting a M2M service and of the M2M service identifier.

In an embodiment, a M2M service identifier corresponds to Mobile Station International ISDN Number MSISDN.

In another aspect, in an embodiment, the present invention provides a method for handling M2M services in a communication system, said method comprising a step of:

an entity in charge of managing communications of M2M terminals controlling in an entity storing subscriber data in said communication system an association between a M2M service identifier and the M2M terminals supporting this M2M service.

In an embodiment, said method comprises a step of:
an entity in charge of managing communications of M2M terminals controlling in an entity storing subscriber data in said communication system an association between a M2M service identifier and the M2M terminals supporting this M2M service.

In an embodiment, a M2M service identifier corresponds to Mobile Station International ISDN Number MSISDN.

In other aspects, the present invention provides entities configured to carry out such methods, said entities including in particular: entity storing subscriber data, entity controlling IP-CAN services, entity creating charging information such as in particular CDRs, and entity in charge of managing communications of M2M terminals via a communication system.

In an embodiment, the present invention provides an entity storing subscriber data in a communication system, said entity configured to:

for charging for IP-CAN bearer services in said communication system, provide to an entity controlling said IP-CAN bearer services an indication that a terminal supports a M2M service.

In an embodiment, the present invention provides an entity controlling IP-CAN services in a communication system, said entity configured to:

for charging for IP-CAN bearer services in said communication system, provide to an entity creating charging information for said IP-CAN bearer services an indication that a terminal supports a M2M service.

In an embodiment, the present invention provides an entity creating charging information for IP-CAN bearer services in a communication system, said entity configured to:

agglomerate charging information associated with a terminal supporting a M2M service with charging information associated with other terminals supporting said M2M service.

In an embodiment, the present invention provides an entity in charge of managing communications of M2M terminals in a communication system, said entity configured to:

control, in an entity storing subscriber data in said communication system, an association between a M2M service identifier and the M2M terminals supporting this M2M service.

Implementation of such configuration does not raise any special problem for a person skilled in the art, and therefore does not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for handling Machine to Machine (M2M) services in a communication system, said method comprising:

creating global charging information for a plurality of terminals supporting a same M2M service at an entity creating charging related data for IP Connectivity Access Network (IP-CAN) bearer services in a communication system, wherein the plurality of terminals are associated with a same M2M service identifier that associates each of the plurality of terminals with the same M2M service;

wherein the entity creating charging related data for the IP-CAN bearer services agglomerates charging related data created for terminals associated with the same M2M service identifier to form the global charging information for the M2M service in conjunction with charging the M2M service for IP-CAN bearer services used by the plurality of terminals;

wherein the global charging information is periodically created for the plurality of terminals, the global charging information depending on whether the plurality of terminals support the same M2M service and on whether the M2M service identifier associated with the same M2M service is allocated to the plurality of terminals.

2. The method according to claim 1, further comprising:
providing indications that each of the plurality of terminals support the same M2M service, wherein the indications are provided from an entity storing subscriber data for the communication system to an entity controlling the IP-CAN bearer services.

3. The method according to claim 2, wherein a single M2M service identifier is provided for said plurality of terminals supporting the same M2M service.

4. The method according to claim 1, further comprising:
providing indications that each of the plurality of terminals support the same M2M service, wherein the indications are provided from an entity controlling the IP-CAN bearer services to the entity creating charging related data for the IP-CAN bearer services.

5. The method according to claim 4, wherein said indications are provided in signaling associated with creation of an IP-CAN bearer for at least one of the plurality of terminals.

6. The method according to claim 1, wherein the M2M service identifier corresponds to a Mobile Station International ISDN Number (MSISDN).

7. A method for handling Machine to Machine (M2M) services in a communication system, said method comprising:
controlling, an association between a M2M service identifier and a plurality of M2M terminals supporting a same M2M service in the communication system, wherein the M2M service is associated with the M2M service identifier, wherein the association between the M2M service identifier and the plurality of M2M terminals is controlled by an entity managing communications for the plurality of M2M terminals in an entity storing subscriber data for the communication system;
wherein an entity creating charging related data for IP Connectivity Access Network (IP-CAN) bearer services agglomerates charging related data for M2M terminals associated with the same M2M service identifier to form global charging information for the M2M service in conjunction with charging the M2M service for IP-CAN bearer services used by the plurality of M2M terminals.

8. An entity for storing subscriber data for a communication system, said entity configured to:
provide indications that each of a plurality of terminals in a communication system support a same Machine to Machine (M2M) service, wherein the indications are provided to an entity controlling IP Connectivity Access Network (IP-CAN) bearer services in the communications system, wherein the indications include a same M2M service identifier that associates each of the plurality of terminals with the same M2M service;
wherein an entity creating charging related data for IP-CAN bearer services is configured to agglomerate charging related data created for terminals associated with the same M2M service identifier to form global charging information for the M2M service in conjunction with charging the M2M service for IP-CAN bearer services used by the plurality of terminals.

9. An entity for controlling IP Connectivity Access Network (IP-CAN ) bearer services in a communication system, said entity configured to:
provide indications that each of a plurality of terminals in a communication system support a same Machine to Machine (M2M) service, wherein the indications are provided to an entity creating charging related data for IP-CAN bearer services in the communications system, wherein the indications include a same M2M service identifier that associates each of the plurality of terminals with the same M2M service;
wherein an entity creating charging related data for IP-CAN bearer services is configured to agglomerate charging related data created for terminals associated with the same M2M service identifier to form global charging information for the M2M service in conjunction with charging the M2M service for IP-CAN bearer services used by the plurality of terminals.

10. An entity for creating charging related data for IP Connectivity Access Network (IP-CAN) bearer services in a communication system, said entity configured to:
agglomerate charging related data created for each of a plurality of terminals supporting a same Machine to Machine (M2M) service to form global charging information for the M2M service in conjunction with charging the M2M service for IP-CAN bearer services used by the plurality of terminals wherein the plurality of terminals are associated with a same M2M service identifier that associates each of the plurality of terminals with the same M2M service.

11. The entity according to claim 10, further configured to:
periodically create the global charging information for the plurality of terminals, the global charging information depending on whether the plurality of terminals support the M2M service and on whether the M2M service identifier associated with the same M2M service is allocated to the plurality of terminals.

12. An entity for managing communications of Machine to Machine (M2M) terminals in a communication system, said entity configured to:
control an association between a M2M service identifier and a plurality of M2M terminals supporting a same M2M service in a communication system, wherein the M2M service is associated with the M2M service identifier, wherein the association between the M2M service identifier and the plurality of M2M terminals is controlled by the entity managing communications for the plurality of M2M terminals in an entity storing subscriber data for the communication system;
wherein an entity creating charging related data for IP Connectivity Access Network (IP-CAN) bearer services is configured to agglomerate charging related data created for M2M terminals associated with the same M2M service identifier to form global charging information for the M2M service in conjunction with charging the M2M service for IP-CAN bearer services used by the plurality of M2M terminals.

13. The entity according to claim 12, the entity having an interface with a communication operator, on the entity storing subscriber data that is terminated for the communication operator after the association between the M2M service identifier and the plurality of M2M terminals is controlled in the entity storing subscriber data.

14. The entity according to claim 12, wherein the M2M service identifier corresponds to a Mobile Station International ISDN Number (MSISDN).

15. A method for handling Machine to Machine (M2M) services in a communication system, said method comprising:
providing indications that each of a plurality of terminals support a same M2M service in conjunction with charging the M2M service for IP Connectivity Access Network (IP-CAN) bearer services in a communication system, wherein the indications are provided from an entity storing subscriber data for the communication system to an entity controlling the IP-CAN bearer services in the communication system, wherein the indications include a same M2M service identifier that associates each of the plurality of terminals with the same M2M service;
wherein the entity controlling the IPCAN bearer services provides the indications that each of the plurality of terminals support the same M2M service to an entity creating charging related data for the IP-CAN bearer services;

wherein the entity creating charging related data for the IP-CAN bearer services agglomerates charging related data for terminals associated with the same M2M service to form global charging information for the M2M service in conjunction with charging the M2M service for IP-CAN bearer services used by the plurality of terminals.

16. The method according to claim 15, wherein the global charging information is periodically created, the period for creating the charging information depending on whether the plurality of terminals support the same M2M service and on the M2M service identifier associated with the same M2M service is allocated to the plurality of terminals.

17. The method according to claim 15, wherein the M2M service identifier is provided for the plurality of terminals supporting the M2M service.

18. The method according to claim 15, wherein the M2M service identifier corresponds to a Mobile Station International ISDN Number (MSISDN).

19. The method according to claim 15, wherein said indications are provided by the entity controlling the IP-CAN bearer services in signaling associated with creation of an IP-CAN bearer for at least one of the plurality of terminals.

* * * * *